United States Patent [19]

Amano et al.

[11] Patent Number: 4,772,959
[45] Date of Patent: Sep. 20, 1988

[54] DIGITAL SIGNAL RECORDING AND REPRODUCING APPARATUS

[75] Inventors: Yoshinori Amano, Ibaraki; Shiro Tsuji, Minoo; Hiroshi Matsushima, Hirakata, all of Japan

[73] Assignee: Matsushita Electric Industrial Co., Ltd., Osaka, Japan

[21] Appl. No.: 847,213

[22] Filed: Apr. 2, 1986

[51] Int. Cl.[4] .............................................. G11B 20/12
[52] U.S. Cl. ......................................... 360/8; 360/32; 360/36.2; 360/48
[58] Field of Search .................... 360/32, 8, 9.1, 36.2, 360/19.1, 48; 358/341, 343

[56] References Cited

U.S. PATENT DOCUMENTS 4,138,694  2/1979  Doi ........................................ 360/32
4,646,171  2/1987  Odaka .................................. 360/32

Primary Examiner—Alan Faber
Attorney, Agent, or Firm—Stevens, Davis, Miller & Mosher

[57] ABSTRACT

A novel digital signal recording and reproducing apparatus is disclosed in which an audio digital signal is recorded and reproduced alone or together with a video signal in a video tape recorder. If the sampling frequency of the audio signal is not an integral multiple of the vertical synchronous signal of the video signal, the audio signal is divided among fields in accordance with a predetermined regularity, and then the field information for identifying the number of samples of the audio digital signal is added and recorded for each field. At the time of reproduction, the field information is read to identify the number of samples of the audio digital signal, thus picking out only the audio signal excepting the redundant portions. In adding or inserting a signal of tape 2 to tape 1, the reproduced signal of tape 2 is divided and recorded again among the fields on the basis of the field information obtained from the reproduced signal of tape 1 in such a manner as to satisfy the regularity with which the audio signal already recorded in tape 1 divided among the fields.

9 Claims, 6 Drawing Sheets

FIG. 3

| | n-TH FIELD | (n+1)TH FIELD | (n+2)TH FIELD | (n+3)TH FIELD | (n+4)TH FIELD | (n+5)TH FIELD |
|---|---|---|---|---|---|---|
| SAMPLE NUMBER ALLOTMENT OF AUDIO SIGNAL | 801 SAMPLE / 800 SAMPLE | 801 SAMPLE | 801 SAMPLE | 801 SAMPLE | 801 SAMPLE | 800 SAMPLE |
| FIELD INFORMATION (EX.1) | 1 / 0 | 1 | 1 | 1 | 1 | 0 |
| (EX.2) | "FF" / "00" | "FF" | "FF" | "FF" | "FF" | "00" |
| (EX.3) | 4 / 0 | 1 | 2 | 3 | 4 | 0 |

DIGITAL SIGNAL RECORDING AND REPRODUCING APPARATUS

BACKGROUND OF THE INVENTION

The present invention relates to a digital signal recording and reproducing apparatus which is capable of recording and reproducing an audio digital signal alone or together with a video signal in a video tape recorder (hereinafter referred to as the VTR).

In the conventional apparatus in which an audio digital signal is recorded in a VTR, the sampling frequency of the audio signal is selected to be an integral multiple of the vertical synchronous signal of the video signal to record the audio digital signal in a predetermined number of samples during one vertical scanning period (hereinafter referred to as a "field"). In the case of a PCM audio processor according to the EIAJ (Electronic Machinery Industry Association of Japan) standards, for instance, the audio sampling frequency for the VTR of an NTSC system is set to the frequency of 44,056 KHz, that is 735 times higher than the vertical synchronous signal $(60 \times 1000/1001 \approx 59.94$ Hz). In this case, the audio digital signal of 735 samples per channel is recorded in a signal field of the VTR.

There may be some cases, however, where the audio sampling frequency is not an integral multiple of the vertical synchronous signal. In a PCM recorder used for business purposes for which a sampling frequency of 48 KHz is recommended according to AES (Audio Engineering Society) Standards, for example, an audio digital signal of 800.8 samples is recorded for each channel in a field, dividing one sample, if recorded in a VTR of an NTSC system. When an audio digital signal of 800.8 samples is recorded in a field this way, it is necessary to divide a sample, thereby complicating the circuit configuration. Further, an editing process for each field becomes difficult.

SUMMARY OF THE INVENTION

The object of the present invention is to provide an apparatus for recording and reproducing an audio digital signal in a video tape recorder, wherein even if the sampling frequency of the audio signal is not an integral multiple of the vertical synchronous signal of the video signal, the original audio signal in continued form is capable of being restored by recording and reproduction, and there occurs no dropouts of the sample of the audio digital signal before or after the editing point when the editing process is made for each field.

According to the present invention, there is provided a digital signal recording and reproducing apparatus comprising means for dividing samples of the audio digital signal for respective fields according to a predetermined rule, means for generating field information for identifying the number of samples of the audio digital signal for each field, which number is different for each field, means for recording the audio digital signal combined with the field information for each field, means for detecting the field information at the time of reproduction, means for restoring the original continuous audio signal in accordance with the field information detected, and means for dividing samples of the audio digital signal input on the recording side on the basis of the field information on the reproduction side.

Assuming that several recorded tapes are edited by use of two or more VTRs, when the signal of one tape (tape 2) is added to or inserted into for recording in the other tape (tape 1), the field information obtained from the reproduced signal of tape 1 is used to restore the reproduced signal of tape 2 into the original continuous audio signal. After that, the reproduced signal of tape 2 is divided again for respective fields thereby to correspond to the field division of the reproduced signal of tape 1.

BRIEF DESCRIPTION OF THE DRAWINGS

FIG. 3 is a diagram showing a field allocation the audio digital signal and the field information according to an embodiment of the present invention.

DESCRIPTION OF THE PREFERRED EMBODIMENTS

Description will be made below of an apparatus for recording and reproducing an audio digital signal in a VTR in the case where an audio sampling frequency is not an integral multiple of the vertical synchronous signal of the video signal.

Assume that the audio sampling frequency is 48 KHz as described in the BACKGROUND OF THE INVENTION, and a VTR of an NTSC system is used, as an example. In the VTR of the NTSC system, the vertical synchronous signal is $60 \times 1000/1001$ Hz, and therefore 800.8 samples of the audio digital signal converted by the sampling frequency of 48 KHz are recorded in each field of a channel. It is, however, not expedient to divide one sample to record the divided sample in a field in view of the complication of the circuit configuration and editing processes. According to the embodiment under consideration, therefore, as shown in FIG. 3, five fields are handled as a unit, so that 800 samples of the audio digital signal are recorded in one of them, and 801 samples in the remaining four fields. This is possible in view of the fact that a total of 4004 samples of audio digital signal are recorded in each five fields. Various signal formats are conceivable for the audio section recorded in a field, of which the signal format shown in FIG. 2 will be used as an example for explanation of the embodiment under consideration.

An analog audio signal is converted into an audio digital signal by 48 KHz sampling and 16-bit linear quantization, and is comprised of audio signal pulses $D_0$, $D_1$, $D_2$, ..., $D_{798}$, $D_{799}$ in 800-sample fields, and 801 samples including $D_0$, $D_1$, $D_2$, ..., $D_{798}$, $D_{799}$, $D_{800}$ in 801-sample fields. The 16-bit signal of each sample is divided into symbols of most significant 8 bits and the least significant 8 bits. The sample $D_0$, for example, is represented by the most significant symbol $D_{0U}$ and the least significant symbol $D_{0L}$.

Figure 2:
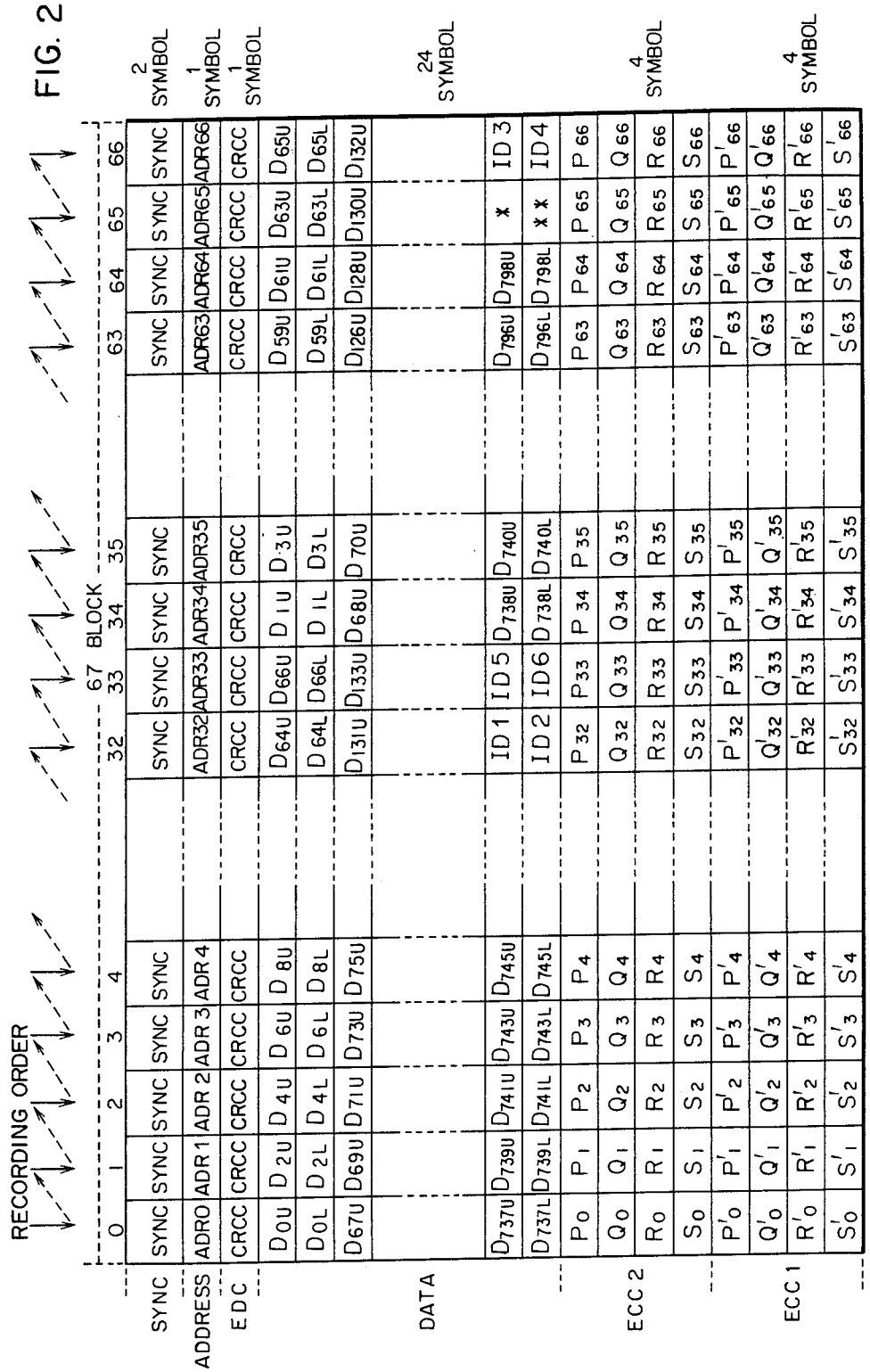
FIG. 2 is a diagram showing a signal format of the audio digital signal in an embodiment of the present invention.

When a signal format is constructed after division into symbols, the signals are rearranged (interleaved) in order to facilitate error correction by dispersing burst dropouts. In FIG. 2, each field is comprised of 67 blocks, so that the sample $D_0$ ($D_{0U}$, $D_{0L}$) is arranged in the block 0, sample $D_1$ ($D_{1U}$, $D_{1L}$) in the block 34, sample $D_2$ ($D_{2U}$, $D_{2L}$) in the block 2, and so on. In the case where a field includes 67 blocks each of which in turn is comprised of 12 samples (24 symbols) of audio digital signal, each field is comprised of 804 samples (1608 symbols). As a result, 4 samples (8 symbols) and 3 samples (6 symbols) of extraneous areas are generated for the 800-sample fields and 801-sample fields respectively. These areas are defined in ID1 to ID6 or ID1 to ID8 in FIG. 2 and may be used as information areas for other than the audio digital signal as index data (ID). In this embodiment, a part of these information areas (hereinafter referred to as "the ID areas") is used to record field information for detecting whether an audio digital signal belongs to the 800-sample fields (hereinafter referred to as "the leap fields") or the 801-sample fields. Various methods are possible for setting and recording the field information in the ID areas. As shown in Example 1 of FIG. 3, for instance, the field information which is 0 for leap fields and 1 for other fields is recorded by use of a bit of LSB of ID1 on the signal format shown in FIG. 2. In Example 2, on the other hand, the field information "00" and "FF" are recorded in hexadecimal form in the leap fields and other fields respectively by using all the 8 bits of ID1. In still another example, as shown in an example 3 of FIG. 3, 0 is recorded in the n-th leap field, 1 in the (n+1)th field, 2 in the (n+2)th field, 3 in the (n+3)th field and 4 in the (n+4)th field. In this way, the 3 bits of ID1 are used for repeated recording of 0 to 4. The embodiment under consideration will be explained below with reference to the most simple case of Example 1.

As explained above, an audio digital signal is arranged in each block, and the field information is set in the ID areas. Two groups of error correction codes (ECC), ECC1 and ECC2 (each having four symbols), are used as shown in FIG. 2. The generation series of each error correction code are not shown. If ECC1 is formed from the symbols of the same block, however, ECC2 is generated from symbols of a plurality of blocks. For example, the data of the 24 symbols including $D_{0U}$, $D_{0L}$, $D_{67U}$, ..., $D_{737U}$, $D_{737L}$ of the block 0 and the four symbols including $P_0$, $Q_0$, $R_0$ and $S_0$ of the block 0 are used to form the four symbols ($P_0'$, $Q_0'$, $R_0'$, $S_0'$) of ECC1 of block 0. On the other hand, data of a symbol selected from every other blocks including $D_{0U}$ of block 0, $D_{4L}$ of block 2, and $D_{75U}$ of block 4 are used to form the four symbols $P_{48}$, $Q_{50}$, $R_{52}$, $S_{54}$ of ECC2 of the blocks 48, 50, 52 and 54 from 24-symbol data in the even-numbered blocks from block 0 to block 46. The other symbols of ECC1 and ECC2 are also formed by following the same rule as mentioned above. In forming ECC2 beyond the block 66 in generation series, however, the process is returned to block 0. In the foregoing description, the data of ECC2 is included in generating ECC1, and therefore ECC2 is formed before ECC1. After generating an error check code in this way, addition is made to each block of two symbols of block sync signal (SYNC), a symbol of block address signal (ADR0 to ADR66) and a symbol of error detection code for the block address signal (EDC) as shown in FIG. 2, so that the signals from blocks 0 to 66 are recorded in a field in accordance with the recording sequence shown in FIG. 2.

Figure 1:
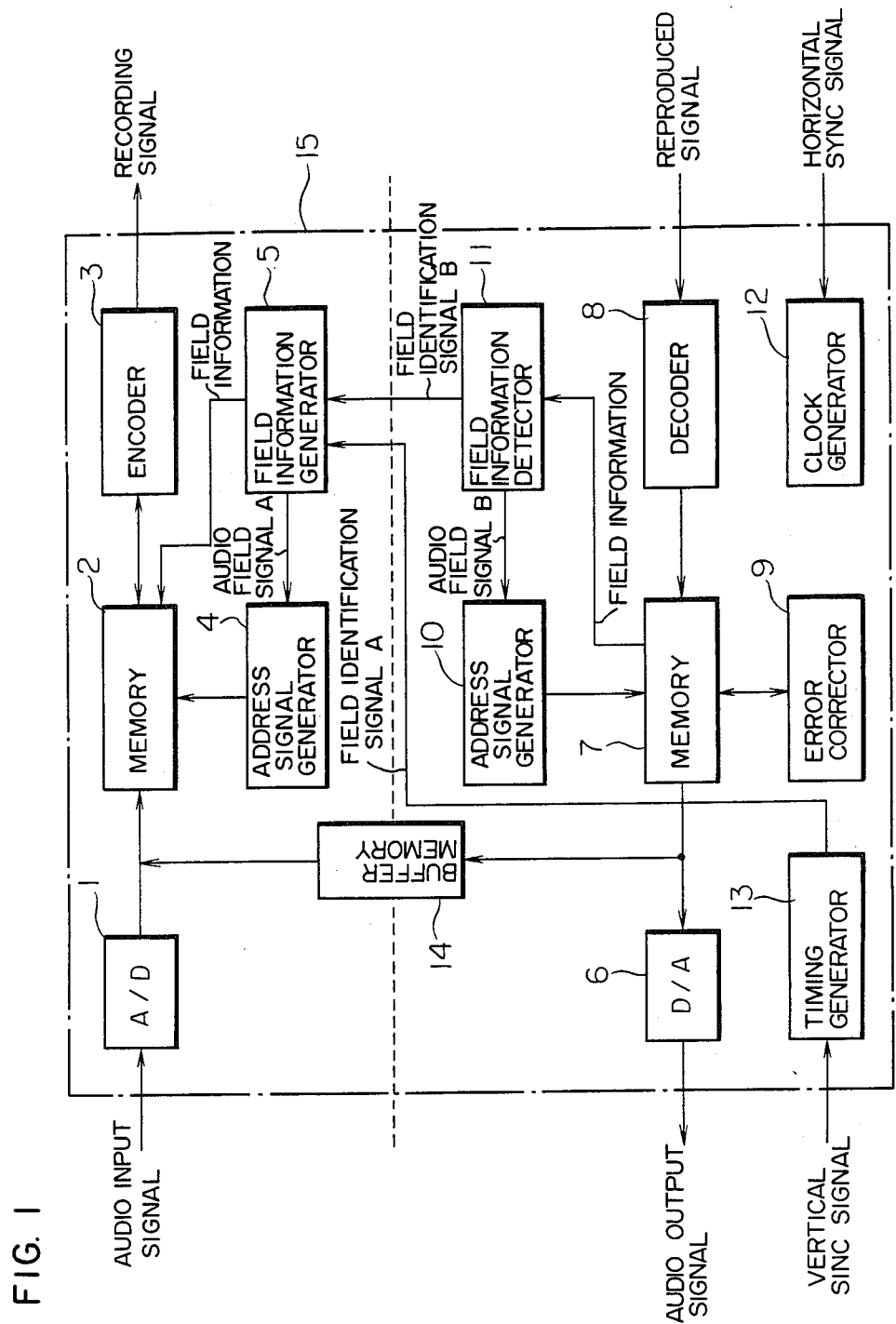
FIG. 1 is a block diagram showing a digital signal recording and reproducing apparatus according to an embodiment of the present invention.

A block diagram of a digital signal recording and reproducing apparatus according to the embodiment under consideration is shown in FIG. 1. The operation of this apparatus shown in the block diagram of FIG. 1 will be explained below with reference to the timing chart of FIG. 4.

In the digital signal recording and reproducing apparatus shown in FIG. 1, a master clock is generated in a clock generator 12 from the horizontal sync signal produced from the VTR. Specifically, a PLL (phase locked loop) circuit is used actually. First, the timing of processing various signals is determined at a timing generator 13 by the vertical synchronous signal from the VTR. The various timings thus determined include the timing of starting to generate an error check code in FIG. 4, the timing of recording the recording signal, and the timing of starting an error correction period.

The analog audio input signal is stored in RAMs of a memory 2 temporarily after being converted into an audio digital signal by an A.D converter 1. There are two RAMs, each having the capacity to store a field of audio digital signal and an error correction code. While, an output signal (audio digital signal) of the A/D converter 1 is being written in one of the RAMs, the audio digital signal that had been read a field before is read from the other RAM thereby to generate the error check codes ECC2 and ECC1 in an encoder 3. The error correction codes ECC1, ECC2 thus generated are written in the same RAM, so that a signal format as shown in FIG. 2 is formed excluding the redundant parts of the signal SYNC etc. on the RAM. Then, in accordance with the recording sequence shown in FIG. 2, the signal is compressed along a time axis for each block and read from the RAM. The signal thus read takes an intermittent form to enable SYNC, ADD0 to ADD66 and EDC to be inserted at the encoder 3. After the redundant parts are inserted at the encoder 3, the recording signal is modulated and applied to the VTR. A well-known modulation process such as FM, MFM or 3PM may be used.

Under normal recording operation, the vertical sync signal from the VTR is used to generate a field identification signal A which becomes high in level for each five fields, at the timing generator 13, and the field information generator 5 generates an audio field signal A and field information in such a manner that a high-level field of the field identification signal A becomes a leap field. An address counter in the address signal generator 4 is controlled by the audio field signal A. The output signal of 800 samples produced from the A/D converter 1 are written in the RAMs of the memory 2 when the field identification signal A is high in level, and the same output signal of 801 samples when the field identification signal A low is in level. At the same time, the signal of the ID area including the field information and the output signal of the A/D converter 1 are written by time division in the RAM. The field information, as shown by Example 1 of FIG. 3, is set in such a manner that LSB of ID1 is zero when the field identification signal A is high in level, and 1 when it is low in level.

Figure 4:
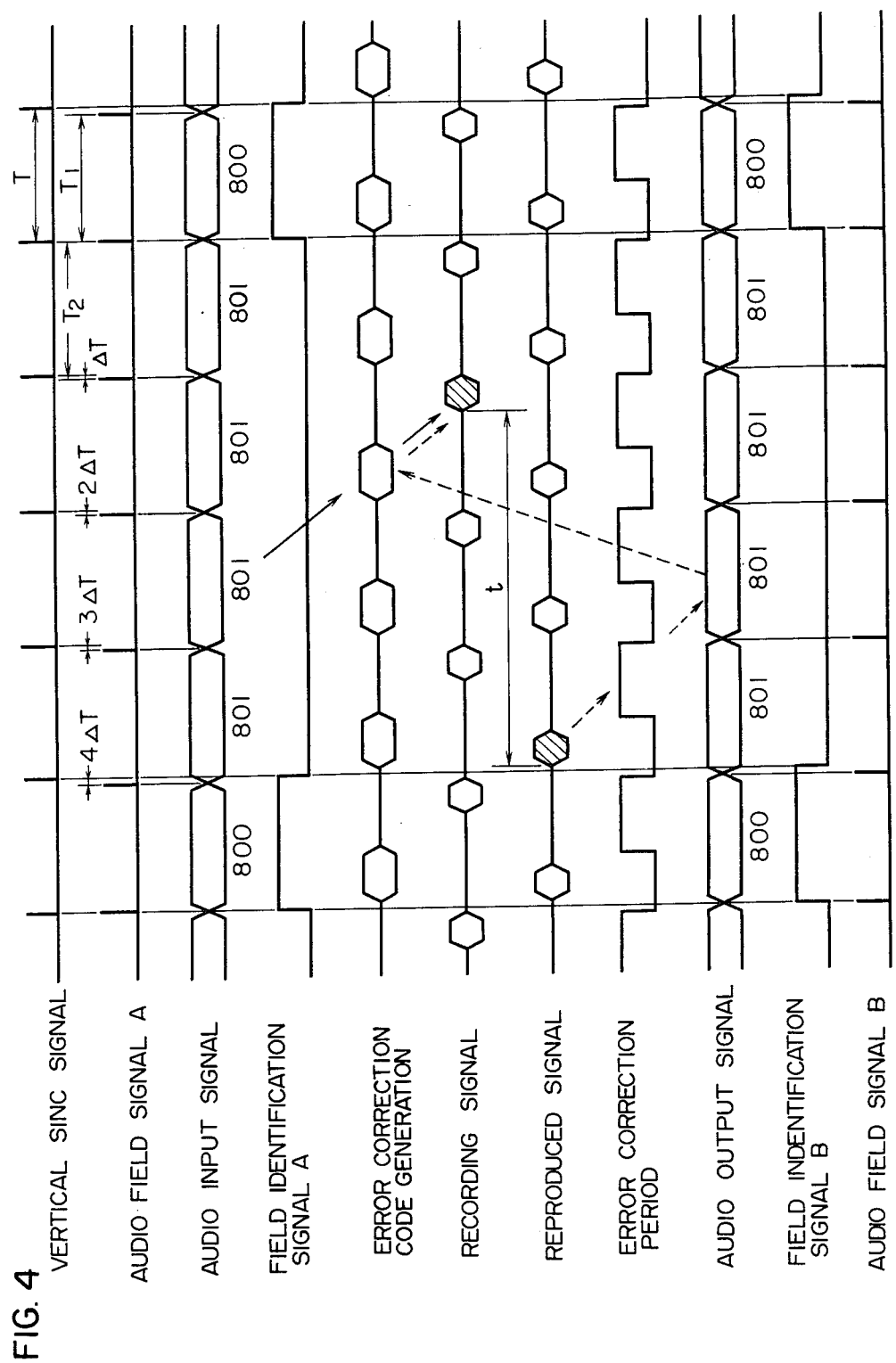
FIG. 4 is a timing chart for explaining the circuit operation of a digital signal recording and reproducing apparatus according to an embodiment of the present invention.

The vertical sync signal and the audio field signal A have a phase difference $\Delta T$, $2\Delta T$, ... as shown in FIG. 4 due to the leap fields. The audio input signal, however, is divided for each field by this audio field signal A. Let the period of the vertical synchronous signal Be T, the field period of the leap field be $T_1$, and the field period of other fields than the leap fields be $T_2$. The relationship given by the equation below is held.

$$5T = T_1 + 4T_2$$

$$800T_2 = 801T_1$$

$\Delta T$ is expressed by the equation below.

$$T = T_2 - T$$

These equations are easily obtained from the fact that $1/T = 60 \times 1000/1001$, $1/T_2 = 48000/800$ and $1/T_2 = 48000/801$.

In a reproduction mode, on the other hand, the reproduced signal is demodulated at a decoder 8, and temporarily stored in a RAM in a memory 7. The memory 7, like the memory 2 of the recording system, has two RAMs, each having the capacity of one field. The demodulated reproduced signal is written in one of the RAMs, and then, errors are corrected at an error corrector 9. In the meantime, a corrected audio digital signal prior to one field is read out of the other RAM, converted into the original time series, and produced to a D/A converter 6.

In the error correction process, ECC1 corrects an error of the signal in the block first of all, followed by the error correction by ECC2 during the high-level error-correction period in FIG. 4. In the case of an error symbol that cannot be corrected, an error flag is formed, and after interpolation, an analog audio output signal is produced through the D/A converter 6. Under reproduction operation, the decision of a leap field is performed after the error correction. The field information is read from the ID area, and if it is found to be 0 by the field information detector 11, a leap field is decided, while if the field information is found to be 1, a field other than the leap fields is decided, so that the field identification signal B and the audio field signal B are generated. The audio field signal becomes high in level when a leap field is decided. The address signal generator 10 controls the memory 7, and generates an address for the RAMs in such a manner as to apply 800 or 801 samples of the audio digital signal except for the ID areas to the D/A converter 6 in accordance with the audio field signal B. In this way, an original continuous audio signal is produced.

When audio signals reproduced from several VTRs are mixed or edited into a master tape, the signal already recorded in the tape and a signal to be newly recorded therein are cross-faded with each other in order to make natural connections of sounds before and after the editing point. In this method, the rate at which these signals are added to each other is changed gradually for recording in a predetermined section before and after the editing point. In this case, it is necessary to reproduce the signal already recorded in the tape and record it in the same position of the same tape. For this reason, the VTR according to the embodiment under consideration is equipped with a reproduction head at a position advanced by time t (described in FIG. 4) from the recording head. The operation of this configuration will be explained below.

The reproduced signal shown by the hatched line in FIG. 4 is demodulated and the error thereof corrected along the arrow of dotted line, so that the signal of the original time series (audio output signal) is applied to a D/A converter 6 and to a buffer memory 14 at the same time. In order to absorb the jitter of clocks of the recording and reproducing systems, the clocks on the reproduction side are used for writing the reproduced signal in the buffer memory 14, while the clocks on the recording side are used for reading therefrom. As a result, the reproduced signal is rendered synchronous with the clock on the recording side through the buffer memory 14.

Generally in recording an analog audio signal, the memory 2 is supplied with an audio digital signal through the A/D converter 1 and is controlled by a field identification signal A in such a manner that the high-level section makes up a leap field, thus producing a recording signal along the arrow shown by solid line in FIG. 4. In recording the reproduced signal again in the same tape, on the other hand, the reproduced signal, after the error thereof is corrected, is applied to the recording side through the buffer memory 14 and to the memory 2 in place of the output of the A/D converter 1. In this case, the signal flow is shown by the dotted arrow in FIG. 4.

In controlling the leap field on the recording side, the audio field signal A is produced by the field identification signal B obtained from the reproduced signal for producing an address for the memory 2 in order to meet the regularity of the signal already recorded. If the time different t between the recording and reproduction heads mentioned above is set to the same length as the time required before the reproduced signal is applied through the reproduction system, the buffer memory 14 and further through the recording system to be recorded in the same tape, then the reproduced signal can be always recorded again in the same position of the same tape in relation with the already-recorded signal. Also, the audio field signal A is generated by the field identification signal B in a manner to coincide with the audio field signal B, and therefore the number of samples of the audio signal for recording always coincides with that of the audio signal for the reproduced signal for the field at the same time point. As a consequence, the regularity of the audio signal between the fields is maintained also in the boundary between the already-recorded signal and the signal to be recorded again.

Now, a method of editing by use of two digital signal recording and reproducing apparatuses and two VTRs according to the present embodiment will be explained with reference to FIG. 5.

Reference will be taken to the case in which two recorded tapes are used and the signal recorded in one tape is added to or inserted into the other tape by recording.

Tape 1 is loaded on VTR 1, and tape 2 on VTR 2. As shown in FIG. 5, VTR1 is coupled with a digital signal recording and reproducing apparatus 15A, and VTR2 with a digital signal recording and reproducing apparatus 15B. The digital signal recording and reproducing apparatuses 15A, 15B are the same as the apparatus 15 shown in FIG. 1. The numerals of each block in the apparatuses 15A, 15B are affixed with A and B with the numerals of blocks shown in FIG. 1, respectively.

Figure 6:
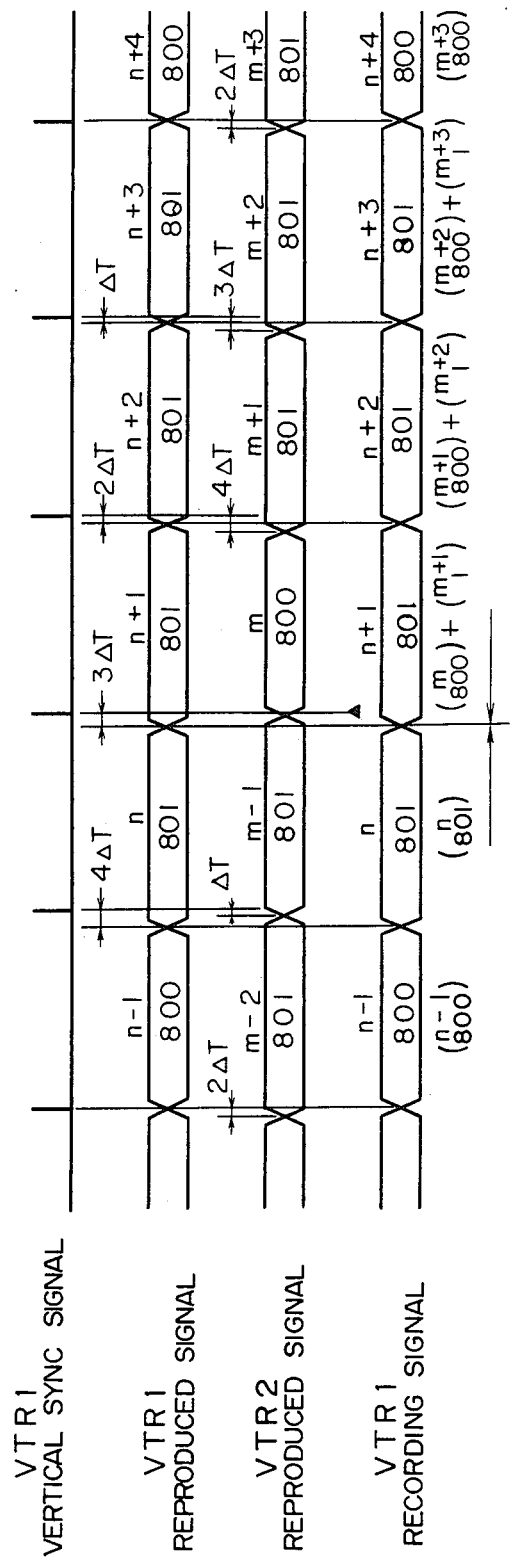
FIG. 6 is a timing chart for explaining the editing operation.

Assume that the m-th field of tape 2 is recorded immediately following the n-th field of tape 1. The VTRs are reproduced separately, and after determining respective editing points, the VTRs are driven reversely from the editing points. The vertical synchronous signal of VTR1 is supplied to VTR2, and the two VTRs are driven in synchronization with each other in such a manner that the respective editing points thereof coincide with each other. An example of the timing of the reproducing signals in this case is shown in FIG. 6. The reproduced signal in this case indicates an audio digital signal returned to the original time series after error correction. Also, the forward end of the field of the reproduced signal has no phase difference with the vertical synchronous signal only for the leap fields.

The (n−1)th field of tape 1 is the leap field, and so is the m-th field of tape 2. Therefore, in the case where the VTRs are driven in such a way that the (n+1)th field of tape 1 and the m-th field of tape 2 come at the same time point as shown in FIG. 6, the reproduced signal of tape 1 and the reproduced signal of tape 2 have different timings of the forward end of each field. The (n-1)th field of tape 1 and the (m-2)th field of tape 2, for instance, have the timing difference of 2ΔT, while the timing of the n-th field of tape 1 is different by (4ΔT−T =3ΔT) from the (m−1)th field of tape 2. Also, the phase difference between the samples of the respective reproduced signals is always 2ΔT. This depends on the editing point of tapes 1 and 2. Both VTRs 1 and 2 are based on the vertical synchronous signal of VTR1, and the reproduced signals of VTR1 and VTR2 contain a jitter respectively. As a result, there exists a phase difference due to the leap field and a jitter at the time of driving between the two reproduced signals.

For applying the reproduced signal of VTR2 to the recording system of VTR1 and recording in tape 1, it is necessary to compensate for the phase difference due to the leap field and the jitter that occurs at the time of driving.

Figure 5:
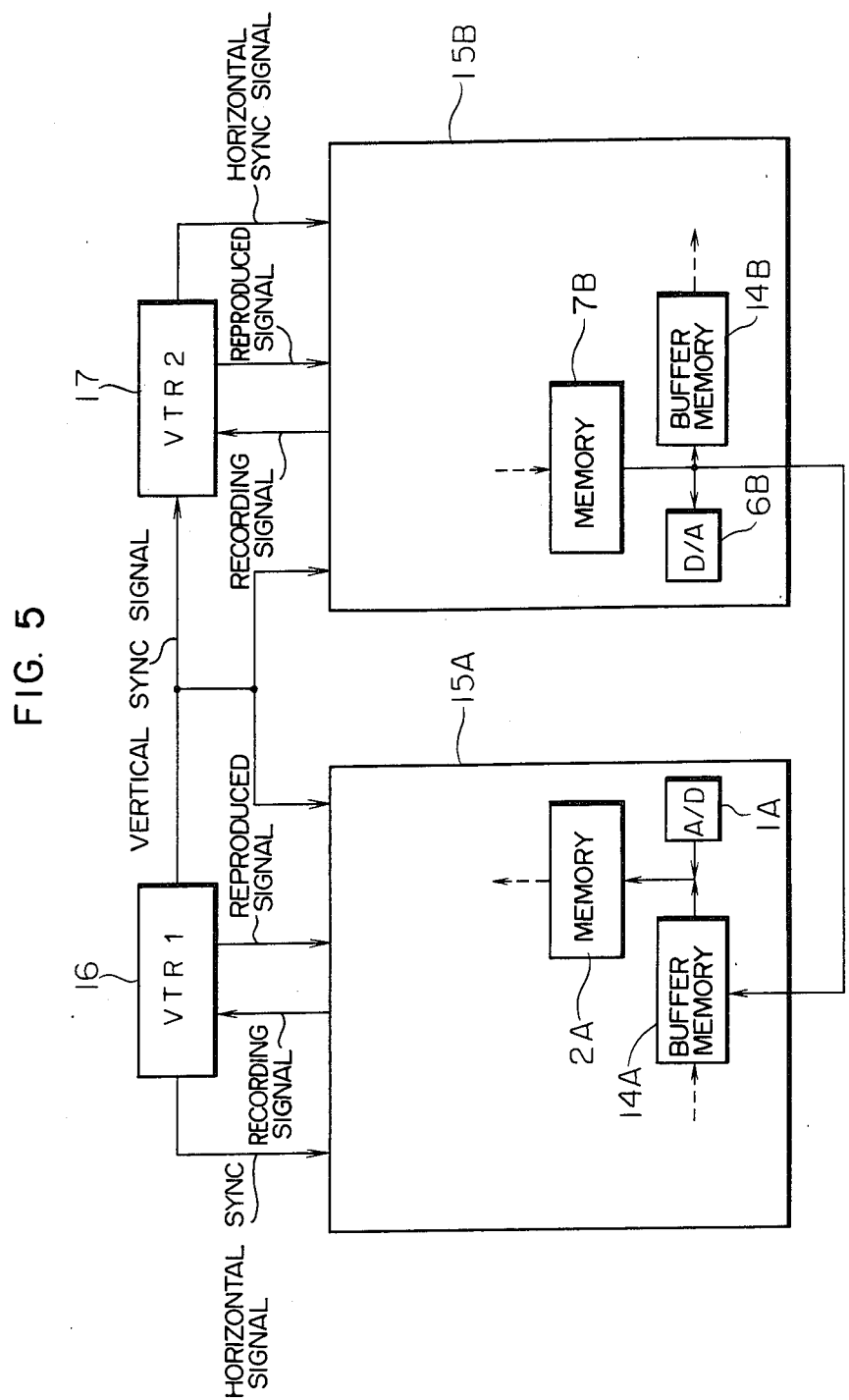
FIG. 5 is a block diagram showing a configuration for an editing process using two digital signal recording and reproducing apparatuses according to an embodiment of the present invention.

As shown in FIG. 5, the reproduced signal of VTR2 returned to the original time series from the memory 7B is sent to the buffer memory 14A of the digital signal recording and reproducing apparatus 15A for the abovementioned compensation. In the buffer memory 14A, the clock of the reproduction system of the digital signal recording and reproducing apparatus synchronous with the reproduced signal of VTR2 is used for writing, while the clock of the recording system of the digital signal recording and reproducing apparatus 15A is used for reading out of the memory. Therefore, through this buffer memory 14A, the reproduced signal of VTR2 is synchronized with the clock of the recording system of the digital signal recording and reproducing apparatus 15A. In the editing operation, it is necessary to maintain the regularity of leap field between the signal already recorded and the newly recorded signal as in the case of recording the reproduced signal again as mentioned above. For this purpose, on the basis of the field information obtained from the reproduced signal of the VTR1, the fields of the recording signal of the digital signal recording and reproducing apparatus 15A are configured. Specifically, in the digital signal recording and reproducing apparatus 15A, the field identification signal A and the audio field signal A of the recording system of the digital signal recording and reproducing apparatus 15A are produced in accordance with the field identification signal B generated from the reproduced signal of VTR1, so that the number of the samples of the audio signal always coincides at the field of the same time point between the reproduced signal of VTR1 and the recording signal sent to VTR1.

This process is taken after the editing point, and the process for recording the reproduced signal of VTR1 again is taken before the editing point. Take the case of FIG. 6 as an example. Before the editing point, the signal of the (n−1)th field of the reproduced signal of VTR1 is applied through the buffer memory 14A to the memory 2A thereby to make up the (n−1)th field of the recording signal of the VTR1. In similar manner, the n-th field of the recording signal of VTR1 is made up of the 801 samples of the n-th field of the reproduced signal of VTR1. In the fields after the editing point, however, the reproduced signal from the VTR1 and VTR2 have different numbers of samples of audio digital signal making up a field. Therefore, in configuring a field of the recording signal of VTR1, the 800 samples of the m-th field of the reproduced signal of VTR2 and the one sample at the top of the (m+1)th field thereof are combined to form 801 samples for the (n+1)th field. In this case, the field information of the (n+1)th field is assumed to be 1. In the (n+2)th field, on the other hand, the 800 samples excepting the leading sample of the (m+1)th field of the reproduced signal of VTR2 are combined with the leading sample of the (m+2)th field to form 801 samples. The field information is assumed to be 1 in this case also. The (n+3)th field is subjected to the same processing as the (n+2)th field. The (n+4)th field, which is a leap field, is configured of 800 samples excepting the leading sample of the (m+3)th field, and the field information of 0 is assumed to be involved. As mentioned above, in the case where the data recorded in tape 2 is added to or inserted into the data recorded in tape 1, the reproduced signal of tape 2 is divided again for each field to satisfy the regularity of the leap field of the tape 1, and field information is newly generated and recorded in tape 1. When the tape 1 thus edited is reproduced, the regularity of the leap fields of audio digital signal is maintained between the fields before and after the editing point. The phase of the field of the audio signal and the vertical synchronous signal coincide with other only once for each five fields, but by dividing the reproduced signal of tape 2 again for each field, the editing by field becomes possible.

It will be understood from the foregoing description that according to the digital signal recording and reproducing apparatus of the present invention, even when the number of samples of the audio digital signal is different from one field to another, it is possible to prevent any time disorder or abnormal noises due to dropouts of audio samples or the like in the joint of fields in the recording and reproducing operation.

What is claimed is:

1. A digital signal recording and reproducing apparatus for use when the sampling frequency of an original continuous audio signal differs from an integral multiple of the vertical synchronous signal of a video signal, said apparatus comprising means for converting said original audio signal to an audio digital signal formed of a number of samples, means for dividing the audio digital signal into fields each containing a number of samples of the audio digital signal, means for generating field information for identifying the number of samples of the audio digital signal in each field, and means for recording the audio digital signal together with the information for identifying the number of samples of the audio digital signal in each field on a recording medium.

2. A digital signal recording and reproducing apparatus according to claim 1, further comprising means for reproducing a recorded audio digital signal and said field information, means for storing a reproduced signal in a reproducing side memory, means for detecting the field information at the time of reproduction, and means for controlling the read address of the reproducing side memory in accordance with the detected field information.

3. A digital signal recording and reproducing apparatus according to claim 2, further comprising a reproduction head provided at a position prior to a recording head in time, said converting means comprising means for sampling said original continuous audio signal and storing the resulting audio digital signal, said apparatus further comprising means responsive to field information detected from the reproduced signal for controlling a write address of the audio digital signal into the recording side memory.

4. A digital signal recording and reproducing apparatus according to claim 2, wherein the sampling frequency of the audio signal is 48 KHz, and said recording and reproducing apparatus operates as an NTSC system, and wherein the audio digital signal is divided so that five fields make up 4004 samples.

5. A digital signal recording and reproducing apparatus according to claim 4, wherein the audio signal is divided, so that one field makes up 800 samples and the other four fields each make up 801 samples for each channel.

6. A digital signal recording and reproducing apparatus according to claim 5, wherein an area for recording a digital signal other than an audio digital signal is provided in each field on said recording medium, each field having the same length of areas where the audio digital signal and digital signals other than the audio digital signal are recorded respectively, said field information being recorded in the digital signal recording area.

7. A digital signal recording and reproducing apparatus according to claim 6, wherein said audio digital signal is formed of blocks and each block includes 12 samples and the audio signal for each field is made up of 67 blocks, each field having a digital signal recording area for other than the audio digital signal, said digital signal recording area corresponding to four samples for a field of an 800-sample audio signal, and three samples for a field of an 801-sample audio signal, the field information being recorded in said digital signal recording area.

8. A digital signal recording and reproducing apparatus according to claim 6, wherein the field information of at least one bit is generated to discriminate the field of an 800-sample audio signal and the fields of an 801-sample audio signal.

9. A digital signal recording and reproducing apparatus according to claim 6, wherein the field information of at least three bits corresponding one by one to the numerals, 1, 2, 3, 4 and 5 for each five fields is added to each field.

* * * * *